United States Patent Office

3,809,766
Patented May 7, 1974

3,809,766
METHOD FOR PRODUCING AN ENHANCED FREEZE DRIED COFFEE
Robert P. Stolz, Dumont, N.J., assignor to General Foods Corporation, White Plains, N.Y.
No Drawing. Filed May 12, 1972, Ser. No. 252,773
Int. Cl. A23f 1/08
U.S. Cl. 426—362
12 Claims

ABSTRACT OF THE DISCLOSURE

An aromatized glyceride is distributed in discrete particle or droplet form onto the surface of a slab of partially frozen coffee extract which is then completely frozen, comminuted and freeze dried. The aromatized glyceride may be in the form of frozen particles, and the aromatized slab of coffee extract may be covered with an upper layer of extract.

BACKGROUND OF THE INVENTION

Soluble coffee products have gained great consumer acceptance in spite of the fact that beverages produced from these products do not have all the flavor and aroma of freshly brewed coffee. Recently the use of freeze drying techniques for producing soluble coffee have become quite widespread and although these freeze dried products are considered to produce more flavorful and aromatic beverages than spray dried coffees, they still lack the full flavor and aroma of fresh brewed coffee. It has previously been proposed to incorporate coffee aromas in a glyceride carrier and to then combine this aromatized glyceride with liquid coffee extract prior to drying the extract. It has, however, been a problem to uniformly distribute the aromatized glyceride into the extract since volatiles will be lost during the mixing or homogenization step.

A means has now been found to incorporate volatile coffee aromas into coffee extract without the necessity of physically mixing the components.

According to a well-known method of producing freeze dried coffee a liquid coffee extract is spread as a relatively thin layer, usually about one quarter to one inch in thickness, on a freezing surface, such as a metal belt or tray, and the extract is frozen. Usually it is desirable to freeze the coffee extract over an extended period of time and methods of doing this are illustrated in U.S. Pat. No. 3,253,420 to DeGeorge, 3,399,061 to Lutz and 3,443,963 to Simon et al.

This invention makes use of the fact that coffee extract may be frozen prior to freeze drying in the form of a thin sheet or slab which has a large surface area and the fact that the coffee extract passes through a partially frozen or slush state before it is completely frozen. By means of this invention an enhanced freeze dried coffee can be produced without the necessity of altering the basic freeze drying process of freezing a slab of extract, grinding the slab and freeze drying the ground particles. Additional steps such as independently slushing the coffee extract as described in commonly-assigned, copending U.S. Application Ser. No. 252,772 entitled "Method For Producing Enhanced Soluble Foodstuffs" are avoided. It has been found that a slushing operation presents problems not only in controlling the amount of ice in the slush but also in processing and handling the viscous slushed extract.

SUMMARY OF THE INVENTION

This invention is directed to a method for producing enhanced freeze dried coffee by first incorporating volatile coffee aroma such as grinder gas, steam aromas, etc. with a liquid glyceride such as a vegetable oil and then distributing this aromatized oil over the surface of a partially frozen slab of coffee extract. The aromatized glyceride may be distributed in the form of frozen particles which are scattered onto the slab or as a liquid material which is sprayed onto the slab; in either event, the temperature of the partially frozen extract should be below the congealing point of the glyceride. In this manner frozen particles of aromatized glyceride are prevented from melting and any liquid glyceride material applied to the surface of the slab is immediately solidified.

The aromatized slab of coffee is preferably completely frozen, comminuted, such as by grinding, and then freeze dried. The resultant freeze dried coffee is a relatively uniformly enhanced product which exhibits increased flavor and aroma when dissolved in hot water, compared to unenhanced freeze dried coffee.

An additional embodiment of this invention includes the use of a second layer of coffee extract, preferably slushed extract, on top of the first enhanced slab. This will in effect create a sandwich effect and may promote a more uniform distribution of the volatile enhances throughout the freeze dried coffee. When two separate layers of extract are used it will be desirable to reduce the thickness of each layer to below the thickness employed when only a single layer of extract is used. Usually the thickness will be reduced one-half, since most freezing and freeze drying systems are designed to handle a given thickness of material, irrespective of the fact that the material is formed from one or two layers of extract.

DESCRIPTION OF THE INVENTION

Freeze dried coffee powders are enhanced according to this invention in such a manner that desirable aroma is released when the powder is dissolved in a liquid such as hot water.

According to this invention natural or synthetic volatile enhancers are combined with a liquid glyceride, preferably an oil, carrier, distributed over the surface of a partially frozen slab of coffee extract which is then completely frozen, comminuted and freeze dried. A preferred method also includes the steps of freezing the enhanced glyceride and subdividing this frozen material in small particles which are then added onto the partially frozen slab.

Typical of the natural material particularly useful for enhancing soluble coffee are aromas obtained from roaster and grinder gases and condensates obtained from the steam-distilled volatile aromas described in U.S. Pat. Nos. 2,562,206 to Nutting, 3,132,947 to Mahlmann, 3,244,521 to Clinton et al., 3,421,901 to Mahlmann et al., 3,532,507 to Cascione, and 3,615,665 (CVA) to White et al., and the vacuum-distilled volatile aromas described in U.S. Pat. Nos. 2,680,687 to Lemonnier and 3,035,922 to Mook et al. Typical synthetic enhancers for soluble coffee are the mercaptans, diacetyls and others, such as described in U.S. Pat. No. 1,696,419. Naturally these enhancing materials may be used either alone or in combination.

Suitable glyceride carriers are coffee oil, the bland-tasting vegetable fats such as cottonseed oil and coconut oil and the like. Glyceride carrier should be chosen such that it does not detract from the aroma and taste of the end product, has a relatively low melting point, does not affect the solubility of the dry product, and has storage stability at least equal to that of freeze dried coffee. The glyceride is chosen so that the melting point of the glyceride will be below the temperatures at which the enhanced, freeze dried coffee powder is dissolved. Preferably the congealing or solidification point of the glyceride should be above the temperature of the partially frozen coffee slab to which it is added. Usually this will necessitate a congealing point of above $-13.5°$ F., the eutectic point of coffee extract, and preferably above about 25° F.

Usually the volatiles will be in the form of a condensate such as the grinder gas frost described in U.S. Pat. No. 3,021,218 to Clinton et al. or a condensed steam aroma such as described in the aforementioned steam-distilled aroma patents. However, it will also be possible to merely have the glyceride carrier directly absorb gaseous aromas.

The enhanced glyceride is distributed onto the surface of a slab of partially frozen coffee extract. Preferably the enhanced glyceride is deposited onto the slab as discrete particles or droplets. Particle of the enhanced glyceride can be formed by cooling the glyceride to below its congealing point and then subdividing the solidified material such as by grinding. It is desirable in order to assure proper distribution to produce particle of the solidified material having a size smaller than about 80 U.S. mesh (177 microns). Droplets of the enhanced glyceride can be formed by conventional spraying or atomizing techniques.

The partially frozen slab will usually be on the order of about 0.25 to 1.0 inch in thickness. This is conventional thickness for slabs which are to be ground and freeze dried. The temperature of the partially frozen extract to which the glyceride is added should be below the congealing point of the glyceride material and normally will be below about 28° F. The enhanced glyceride is usually added to the slab at a weight level of glyceride to soluble solids in the extract of about 0.5% to 2.0%. Proportionally higher levels would naturally be added if the enhanced freeze dried material produced in accordance with this invention were used as only a fractional component of a soluble coffee product.

As previously mentioned it may be desirable in order to increase the uniformity of enhancement to incorporate the enhanced glyceride between two layers of partially frozen extract. This can be done by forming a first layer of partially frozen extract, usually about 0.1 to 0.5 inch thick, distributing the enhanced glyceride onto the surface of this glyceride, depositing an upper layer of slushed extract, usually of comparable thickness, and thereafter completely freezing, comminuting and freeze drying the material as previously set forth.

As will be apparent to those skilled in the art, the product produced in accordance with this invention may be used either alone or as a fractional component of a soluble coffee product.

This invention is further described but not limited by the following example.

EXAMPLE

Liquid coffee extract at 27% soluble solids by weight and 37° F. is applied to a continuous stainless steel freezing belt which is covered by a thin film of water (about 0.01″) to act as release sheet. The belt is two feet wide, is operated by two pulleys located about 50 feet apart and provides a 60 minute freezing period for the coffee extract to be completely frozen. The belt is cooled by contact with two cold brine tanks located on the underside of the belt, one tank having a temperature of 20° F., and the other −30° F. The first half of the belt is cooled for 30 minutes at 20° F. and the second half for 30 minutes at −30° F. Additional freezing is provided over the second half of the belt by refrigerated fins having a temperature of −35° F. to −25° F. located about three inches above the layer. The coffee layer is applied at a thickness of about three-eighths of an inch and the liquid extract is retained by rubber side skirts.

Grinder gas is collected by grinding freshly roasted coffee in a hooded Gump grinder and this gas is condensed as a frost by means of liquid nitrogen. This frost is added to cottonseed oil at a level of one gram of frost per ml. of oil. The aromatized oil is kept at below −20° F. and ground through a 100 U.S. mesh screen. These frozen particles are sprinkled onto the surface of the coffee extract layer at the midpoint of the belt and at a level of weight of oil to weight of soluble solids in the extract of 1%.

The completely frozen slab of aromatized coffee extract is taken from the end of the belt, ground to below 8 mesh (U.S. Standard Screen) and dried in a commercial freeze drying unit at a vacuum of below 500 microns. The resulting freeze dried coffee product exhibits a pleasant aroma when dissolved in hot water and is rated superior to comparable unaromatized coffee.

Having thus described the invention what is claimed is:

1. A method for producing an enhanced freeze dried coffee powder comprising the steps of:
    (a) producing a liquid coffee extract,
    (b) spreading the liquid extract onto a freezing surface in the form of a thin layer,
    (c) partially freezing the liquid extract,
    (d) distributing discrete portions of an enhanced glyceride over the surface of the partially frozen layer of extract, the temperature of the extract being less than the congealing temperature of the glyceride,
    (e) completely freezing the enhanced layer of extract,
    (f) subdividing the frozen extract,
    (g) freeze drying the frozen, subdivided extract.

2. The method of claim 1 wherein the freezing surface comprises a moving metal belt.

3. The method of claim 1 wherein the thin layer of extract has a thickness of about 0.25 to 1.0 inch.

4. The method of claim 1 wherein the enhanced glyceride is sprayed onto the surface of the partially frozen layer of extract.

5. The method of claim 4 wherein the glyceride is a vegetable oil.

6. The method of claim 5 wherein the enhancing material is coffee aroma.

7. The method of claim 6 wherein the coffee aroma comprises grinder gas.

8. The method of claim 1 wherein the enhanced glyceride is in the form of frozen particles of an enhanced liquid glyceride.

9. The method of claim 8 wherein the glyceride is a vegetable oil.

10. The method of claim 9 wherein the enhancing material is coffee aroma.

11. The method of claim 10 wherein the coffee aroma comprises grinder gas.

12. The method of claim 1 wherein the enhanced layer of extract is covered with a second layer of partially frozen extract.

References Cited

UNITED STATES PATENTS

| | | | |
|---|---|---|---|
| 3,373,042 | 3/1968 | Elerath et al. | 99—71 |
| 3,244,533 | 4/1966 | Clinton et al. | 99—71 |
| 2,947,634 | 8/1960 | Feldman et al. | 99—71 |

FRANK W. LUTTER, Primary Examiner

W. L. MENTLIK, Assistant Examiner

U.S. Cl. X.R.

426—385, 388